Figure 1:
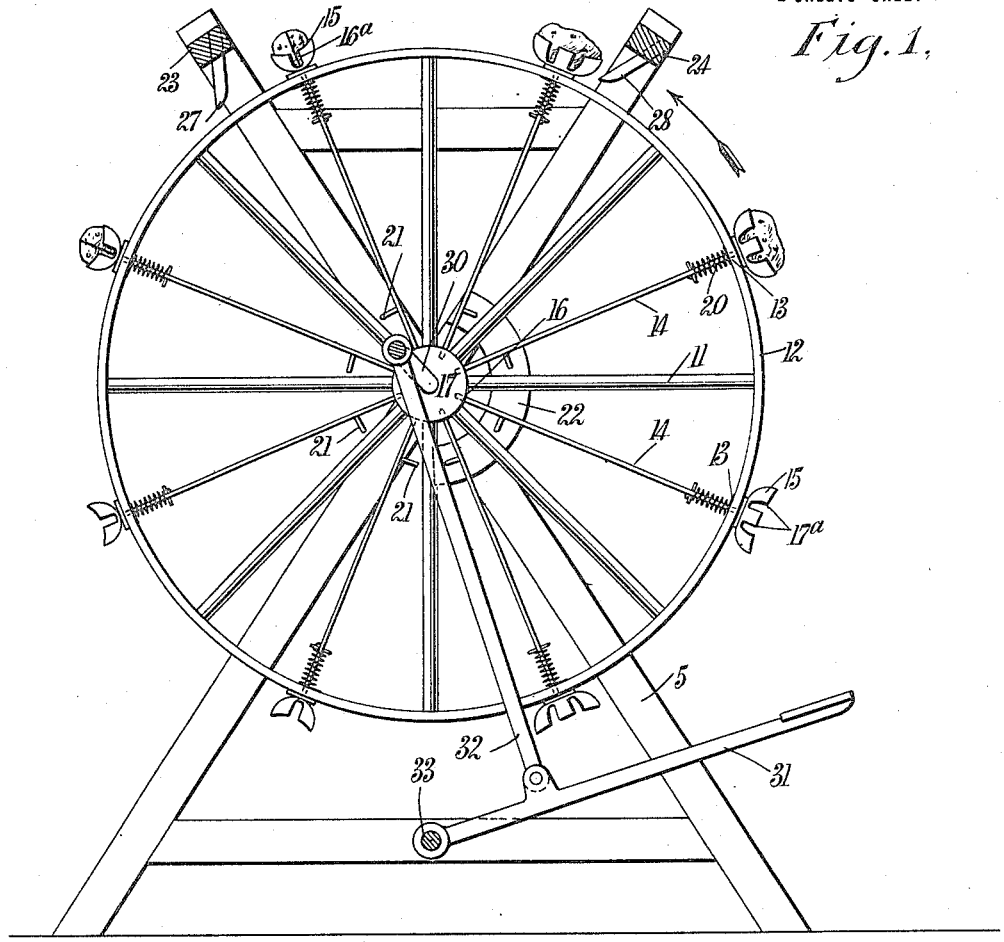

W. S. SMALL.
POTATO CUTTER.
APPLICATION FILED NOV. 17, 1915.

1,193,437.

Patented Aug. 1, 1916.
2 SHEETS—SHEET 1.

WITNESSES
Edw. Thorpe
E. B. Marshall

INVENTOR
Walter S. Small
BY
ATTORNEYS

W. S. SMALL.
POTATO CUTTER.
APPLICATION FILED NOV. 17, 1915.

1,193,437.

Patented Aug. 1, 1916.
2 SHEETS—SHEET 2.

WITNESSES
Geo. W. Naylor
E. B. Marshall

INVENTOR
Walter S. Small
BY Munn & Co
ATTORNEYS

UNITED STATES PATENT OFFICE.

WALTER SCOTT SMALL, OF CHARLESTON, MAINE, ASSIGNOR OF ONE-HALF TO SYLVANUS C. SMALL, OF CHARLESTON, MAINE.

POTATO-CUTTER.

1,193,437.  Specification of Letters Patent.  Patented Aug. 1, 1916.

Application filed November 17, 1915. Serial No. 61,926.

*To all whom it may concern:*

Be it known that I, WALTER S. SMALL, a citizen of the United States, and a resident of Charleston, in the county of Penobscot and State of Maine, have invented a new and Improved Potato-Cutter, of which the following is a full, clear, and exact description.

My invention relates to potato cutters and it has for its object to provide one with means for moving cups for holding potatoes by a knife for severing the potatoes.

Another object of the invention is to provide means for holding the cups in position as they pass the knife, and for turning the cups relatively to the path of their forward movement, so that another knife will cut the potatoes at an angle to the cut made by the first-mentioned knife.

Additional objects of the invention will appear in the following complete specification, in which the preferred form of the invention is described.

In the drawings similar characters of reference indicate corresponding parts in all the views, in which—

Figure 2:
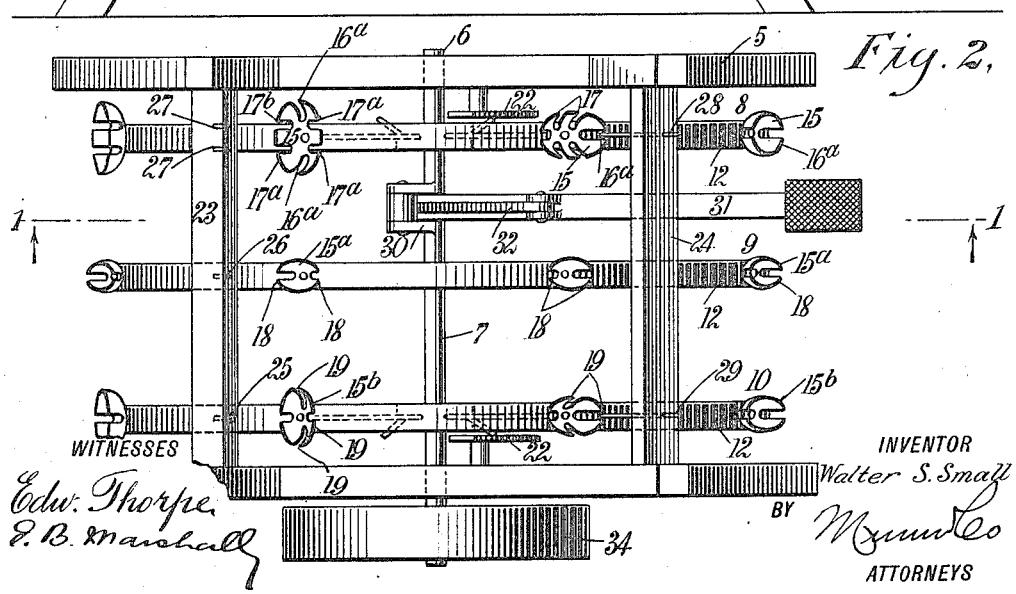
Figure 3:
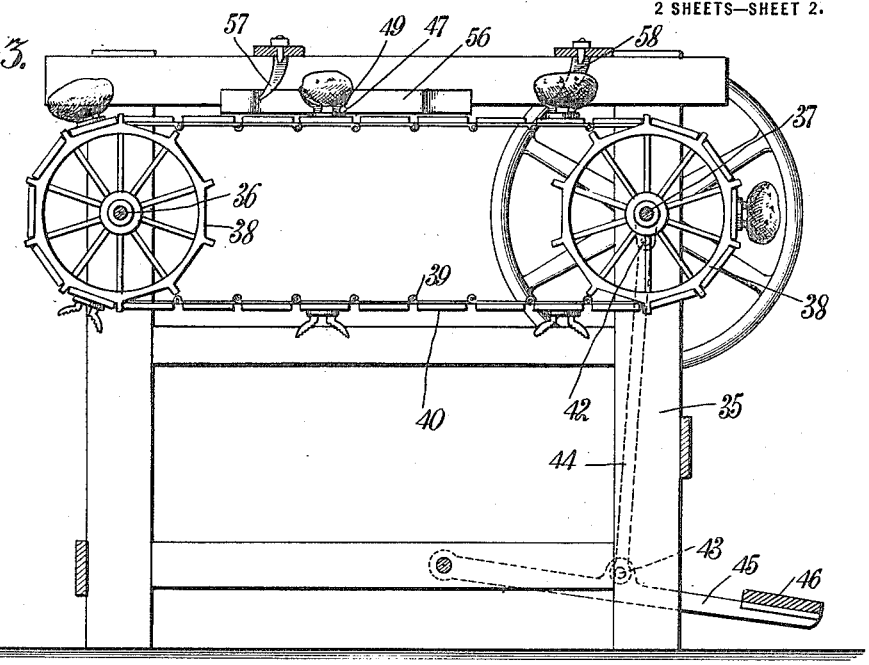
Figure 4:
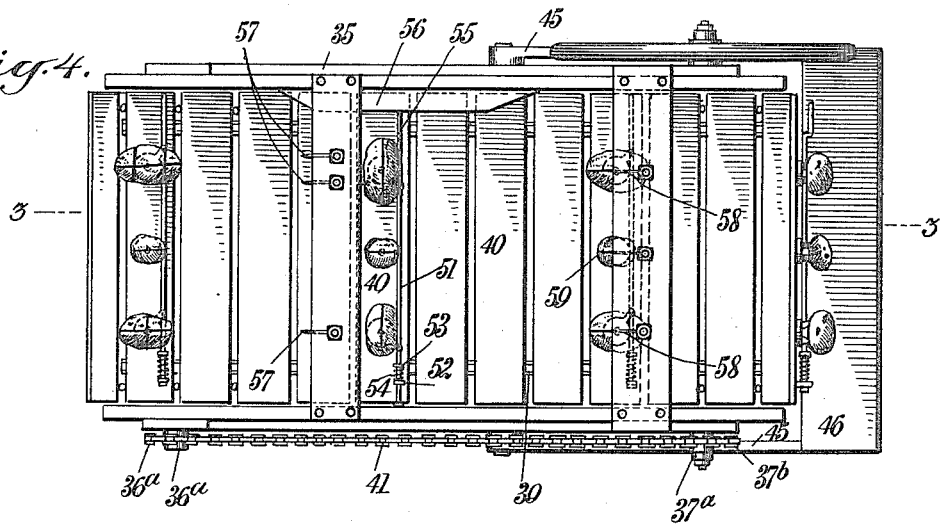
Figure 5:
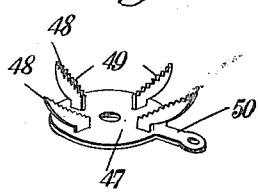

Figure 1 is a sectional view on the line 1—1 of Fig. 2; Fig. 2 is a plan view of the device; Fig. 3 is a sectional longitudinal elevation of a modified form of the invention. Fig. 4 is a plan view of Fig. 3; and Fig. 5 is a perspective view of the potato retaining member used in the form of the device shown in Figs. 3 and 4 of the drawings.

By referring to the drawings it will be seen that a frame 5 is provided, having bearings 6, in which is journaled a shaft 7. Wheels 8, 9 and 10 are provided with spokes 11, which are secured to the shaft 7, these wheels 8, 9 and 10 having annular members 12 with bearings 13, in which rods 14 are journaled, the inner ends of the rods 14 being journaled in bearings 16 of the hubs 17. The rods 14 project through the bearings 13, and secured to the rods 14 at the outer sides of the annular members 12 there are cups 15, 15$^a$ and 15$^b$. The cups 15, which are secured to the rods 14 on the wheel 8, have slots 16$^a$, which extend through the ends of the cups, and two sets of slots 17$^a$, which extend through the sides of the cups. The cups 15$^a$, which are secured to the rods 14, mounted on the wheel 9, have one set of slots 18, which extend through opposite sides of the cups. The cups 15$^b$, which are secured to the rods 14, mounted on the wheel 10, have four slots 19, which are spaced apart and extend through the sides of the cups. The rods 14, mounted on the wheels 8 and 10, are held yieldingly against rotation relatively to the wheels 8 and 10 by means of the springs 20. These rods, mounted on the wheels 8 and 10, are also provided with projecting fingers 21, which are provided for engaging plates 22. Transverse members 23 and 24 are provided for connecting the members of the frame at the top of the wheels, the transverse member 23 being provided with a knife 25, for passing through slots 19 in the cup 15$^b$, a knife 26 for passing through the slots 18 in the cup 15$^a$, and two knives 27 for passing through the slots 17$^a$ in the cup 15. The transverse member 24 is provided with a knife 28 for passing through the slots 16$^a$ in the cup 15, and a knife 29 for passing through the other slot 19 in the cup 15$^b$. A crank 30 is secured to the shaft 7, and this crank 30 is connected with a treadle 31 by means of a link 32, the treadle 31 being journaled to a shaft 33 secured to the sides of the frame 5. A fly wheel 34 is secured to the shaft 7 beyond the frame 5, and this fly wheel may if desired be used as a pulley, but it is understood that the shaft 7 may be rotated by any suitable means.

In using the invention the wheels are rotated by means of the treadle 31, and the potatoes are disposed in the cups 15, 15$^a$ and 15$^b$ at the right of the machine, the wheels rotating in the direction of the arrow. The smallest potatoes are disposed in the cups 15$^a$, the potatoes somewhat larger are disposed in the cups 15$^b$, and the largest potatoes are disposed in the cups 15. As the wheel 9 rotates the knife 26 passes through the slots 18, severing the potatoes disposed in the cups 15$^a$. On the rotation of the wheel 8 the pins 21 engage the plate 22 to rotate the rods 14 journaled in the bearings 13 in the periphery 12 of the said wheel. This rotates the said rods 14, with the cups 15, so that the knife 28 will pass through the slots 16$^a$ to cut the potatoes. On the continued rotation of the wheel 8, the pins 21 pass the plate 22 when the springs 20 rotate the rods 14, and with them the cups 15, so that the two knives 27 will pass through the two pairs of slots 17 to make two additional cuts in the potatoes disposed in the cups 15. In the same way the cups 15ᵇ, with their rods 14, will rotate when the pins 21 pass the other plate 22 so that the knife 29 will cut the potatoes disposed in the cups 15ᵇ in one direction and the knife 25 will pass through the other slots 19 and again cut the potatoes at angles to the cuts made by the knife 29.

In the modified form of the invention shown in Figs. 3 and 4 of the drawings there is a frame 35, having bearings in which the shafts 36 and 37 are journaled, two sprocket wheels 38 being spaced apart and mounted on the shaft 36, and two sprocket wheels being spaced apart and mounted on the shaft 37. These sprocket wheels 38 are connected by two belts or sprocket chains 39, transversely disposed slats 40 being secured to the sprocket chains 39 to travel therewith. The shaft 36 has a projection 36ᵃ, beyond the frame 35, and the shaft 37 has a projection 37ᵃ beyond the frame 35. Sprocket wheels 36ᵇ and 37ᵇ are mounted on the ends 36ᵃ and 37ᵃ on the shafts 36 and 37, the sprocket wheels 36ᵇ and 37ᵇ connected by a sprocket chain 41, the sprocket wheels 36ᵇ and 37ᵇ, together with the sprocket chain 41 being provided to assist in assuring a uniform movement to the belts or sprocket chains 39, which carry the transverse slats 40. A crank 42 is secured to the shaft 37, and this crank 42 is connected with a transverse bar 43, having its terminal secured to the treadle arms 45, which are connected by a foot member 46. On certain of the slats 40 are pivoted potato holders 47, the potato holders 47 having radially disposed arms 48, with teeth 49, so that they are adapted to engage and carry a potato. Each of these potato holders also has a finger 50, the finger 50 on the potato holders 47, which are pivoted to one of the slats 40, being articulated to a transverse rod 51 this transverse rod 51 extending through a bearing 52, secured to the slat and having a projection or collar 53, so that when the spring 54 is wound on the rod 51, between the bearing 52 and the collar or projection 53, the spring will tend to hold the rod 51 in position, where its terminal 55 may be engaged by the plate 56 secured to the side of the frame. It will be understood that as the slat 40 is moved lengthwise of the frame, the terminal 55 of the rod 51 will engage the plate 56, to move the rod 51 so that it will rotate the potato holders 47 and hold them in position so that the knives 57 will cut the potatoes held by the holders at an angle to the cuts made by the knives 58, which cut the potatoes before the terminal 55 of the rod 51 came in contact with the plate 56. When small potatoes are to be used it is not necessary that they be cut into as many pieces, and, in such a case, it is not necessary to rotate the potato holders 47, it merely being necessary to provide a knife 59, which will cut the potato into two parts, which are small enough for planting. It will be understood that the potatoes will be fed to the machine at the right, and that they will fall from the potato holders at the left of the sprocket wheels 38. In other respects the construction shown in Figs. 3 and 4 of the drawings will correspond with the construction shown in Figs. 1 and 2 of the drawings.

Having thus described my invention I claim as new, and desire to secure by Letters Patent:

1. In a potato cutter, a rotatable cup for receiving a potato, a knife, means for moving the cup by the knife, so the knife will cut the potato disposed in the cup, and resilient means for holding the cup yieldingly against rotation.

2. In a potato cutter, a rotatable member for receiving a potato, two knives one disposed in advance of the other, means for moving the member relatively to the knives so that the knives will cut a potato disposed in the member, and resilient means for holding the member yieldingly against rotation.

3. In a potato cutter, a wheel having an annular member with a bearing, a rod rotatably mounted in the bearing, a member for holding a potato and secured to the rod, a knife disposed in the path of the second mentioned member for cutting the potato held by the second mentioned member, a pin on the rod, and a member for engaging the pin for rotating the rod and the member relatively to the wheel.

4. In a potato cutter, a wheel having an annular member with a bearing, a rod rotatably mounted in the bearing, a member for holding a potato and secured to the rod, a knife disposed in the path of the second mentioned member for cutting the potato held by the second mentioned member, a pin on the rod, a member for engaging the pin for rotating the rod and the member relatively to the wheel, and resilient means for holding the rod yieldingly against rotation.

5. In a potato cutter, a wheel having an annular member with a bearing, a rod journaled in the bearing, a member for holding a potato and secured to the rod, a knife disposed in the path of the member for cutting the potato held by the second-mentioned member, a pin on the rod, a member for engaging the pin for rotating the rod, and the member, relatively to the wheel, and resilient means for holding the rod and the second-mentioned member yieldingly relatively to the wheel.

6. In a potato cutter a member, a potato holder pivoted to the member and having a finger, a rod articulated to the finger, two knives spaced apart for cutting a potato held by the potato holder, means for moving the member, and a member for engaging the rod to rotate the potato holder so that one of the knives will cut the potato at an angle to the cut made by the other knife.

7. In a potato cutter a member, a potato holder pivoted to the member, a transverse rod, means by which the rod is adapted to rotate the potato holder, two knives spaced apart for cutting a potato held by the potato holder, means for moving the member, a member disposed at the side of the first-mentioned member for engaging the rod to rotate the potato holder, so that one of the knives will cut the potato at an angle to the cut made by the other knife, and resilient means for holding the transverse rod in a predetermined position.

8. In a potato cutter, a potato holder having a plurality of radially extending arms disposed substantially in the same horizontal plane, the arms being provided with vertically extending teeth for engaging and holding a potato, a knife, and means for moving the potato holder past the knife so that the knife will cut the potato held by the potato holder.

9. In a potato cutter, a pivoted potato holder having a plurality of radially extending arms disposed substantially in the same horizontal plane, the arms being provided with vertically extending teeth for engaging and holding a potato, two knives spaced apart, means for rotating the potato holder, and means for moving the potato holder past the knives so that one of the knives will cut the potato at an angle to the cut made by the other knife.

10. In a potato cutter, a pivoted potato holder having teeth extending substantially parallel with the axis of the holder, resilient means for holding the potato holder yieldingly against rotation, a knife, and means for moving the potato holder past the knife for the purpose specified.

In testimony whereof I have signed my name to this specification in the presence of two subscribing witnesses.

WALTER SCOTT SMALL.

Witnesses:
SYLVANUS C. SMALL,
HERBERT R. SOUTHGATE.